Dec. 28, 1965 A. R. GROENDYCKE 3,226,571

TUNNEL DIODE SHIFT REGISTER

Filed Feb. 1, 1963 2 Sheets-Sheet 1

INVENTOR.
ALAN R. GROENDYCKE

BY

Walter J. Adam

ATTORNEY

INVENTOR.
ALAN R. GROENDYCKE
BY
Walter J. Adam
ATTORNEY 3,226,571

TUNNEL DIODE SHIFT REGISTER

Alan R. Groendycke, Los Angeles, Calif., assignor to Hughes Aircraft Company, Culver City, Calif., a corporation of Delaware Filed Feb. 1, 1963, Ser. No. 255,487
8 Claims. (Cl. 307—88.5)

This invention relates to binary shift registers and particularly to a simplified and improved shift register circuit utilizing tunnel diodes.

A requirement of each stage of a shift register is that a one period delay be provided while the binary information is temporarily stored so that binary signals may be sequentially shifted through a plurality of stages in response to shift pulses. Conventional shift register stages include an RC delay circuit to delay the input pulses, logical diode circuits to respond to the delayed input pulses and to the shift register pulses and a flip-flop for temporary storage. However, these conventional arrangements require a plurality of circuit elements and are limited as to the shift rate of shifting information between stages.

It is therefore an object of this invention to provide a simplified high speed shift register.

It is a further object of this invention to provide an improved shift register circuit that utilizes tunnel diodes for providing a delay and for informational storage so as to have a minimum of circuit elements.

It is another object of this invention to provide a circuit for utilization as a stage in a shift register that operates without conventional diode logical combinations.

It is still another object of this invention to provide a circuit for a shift register stage that develops a delay in response to a first tunnel diode and provides storage by controlling a second tunnel diode.

Briefly in accordance with this invention a shift register includes in each stage a first negative resistance device such as a tunnel diode coupled in a first series path to an inductor to respond to a binary input signal or to be substantially undisturbed in response to the absence of an input signal. The signal developed by the first tunnel diode is differentiated and applied to a second series path as a delayed pulse or as the absence of a pulse. The second series path includes a second tunnel diode and an inductive element responding to the delayed pulse or the absence of a delayed pulse to store the binary information. A shift pulse is applied to the second tunnel diode coincident with the input signal to interrogate the binary information stored therein by the previous delayed pulse or absence thereof. The information is thus stored in the second tunnel diode delayed from the time of a first shift pulse and is shifted to the output at the time of a second shift pulse.

The novel features of this invention, as well as the invention itself, both as to its organization and method of operation, will best be understood from the accompanying description taken in connection with the accompanying drawings, in which like characters refer to like parts, and in which.

Figure 1:
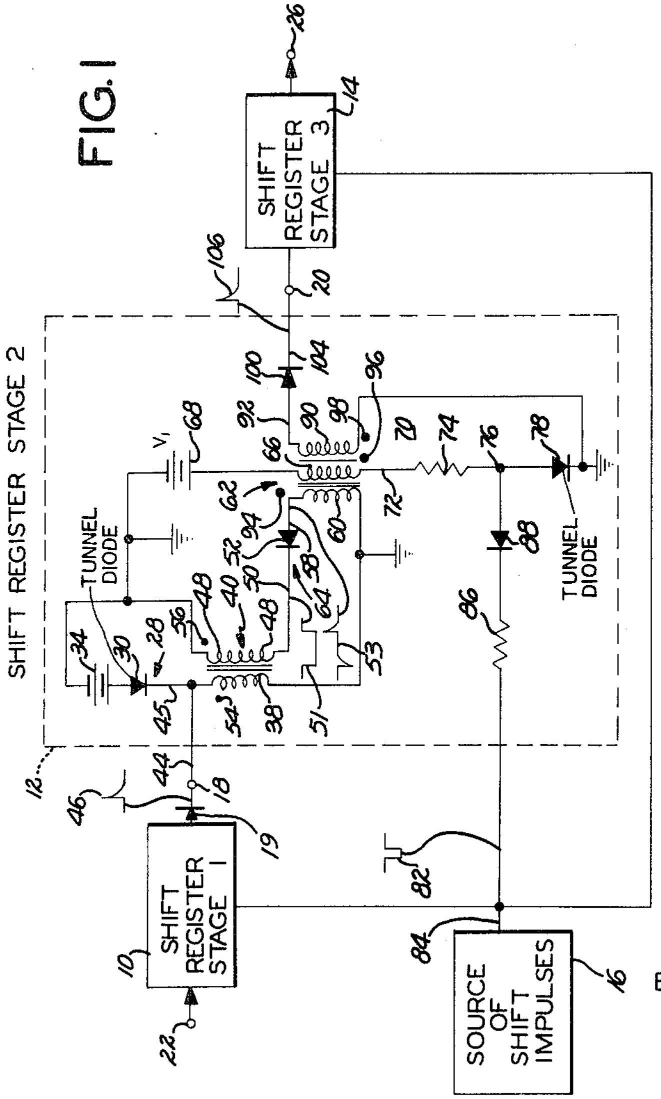
FIG. 1 is a schematic circuit and block diagram of the shift register in accordance with this invention.

Referring first to the circuit of FIG. 1, a shift register may include first, second and third stages 10, 12 and 14, for example, with each responding to a single source of shift pulses 16. Because each shift register stage may be identical, only the second stage 12 will be described in detail. The output signal of the first stage such as at a terminal 18 drives the input of the second stage 12, and the output signal of the second stage such as at a terminal 20 drives the input of the third stage 14. The input signal to the first stage 10 may be applied to a terminal 22 from a suitable source such as a computer memory, for example. The output signal from the last stage which may be the third stage 14 is applied to an output terminal 26 from which signals may be applied to storage elements or adder circuits for example in a computer.

The second stage 12 includes a monostable multivibrator circuit 28 with a series path including a first negative resistance device such as a tunnel diode 30 having an anode coupled to a suitable source of potential such as the positive terminal of a battery 34 which in turn has a negative terminal coupled to ground. The cathode of the tunnel diode 30 is coupled through a lead 45 to the first end of a first winding 38 of a transformer 40 with the second end of the winding 38 coupled to ground. The input terminal 18 is coupled through a lead 44 to the cathode of the tunnel diode 30 at the lead 45 to which binary input signals of a waveform 46 may be applied. A diode 19 which may be considered a part of either the first or the second stage is coupled between the first stage 10 and the input terminal 18. A second winding 48 of the transformer 40 has a first end coupled to ground and a second end coupled to a lead 50 which in turn is coupled to the cathode of a unidirectional current conductive device such as a diode 52.

The transformer 40 may have a polarity relation shown by dots 54 and 56. The anode of the diode 52 is coupled to a lead 58 which in turn is coupled to a first end of a winding 60 of a transformer 62, the second end of the winding 60 being coupled to ground. The diode 52 and the inductive winding 60 form a differentiating circuit 64 so that a narrow delayed pulse of a waveform 53 is formed from a delayed pulse of a waveform 51 developed by the monostable circuit 28.

A second winding 66 of the transformer 62 has a first end coupled to a suitable source of potential such as the positive terminal of a battery 68, the negative terminal thereof being coupled to ground. The winding 66 is included in a series path to provide a bistable storage circuit 70 with the second end of the winding 66 coupled to a lead 72. A resistor 74 is coupled between the lead 72 and a lead 76 which in turn is coupled to the anode of a negative resistance device such as a tunnel diode 78 having a cathode coupled to ground.

Shift pulses of a waveform 82 are applied from the source 16 through a lead 84, and a resistor 86 to the cathode of a unidirectional current conductive device such as a diode 88. The anode of the diode 88 is coupled to the lead 76, the diode 88 being back biased except in response to the negative shift pulse of the waveform 82.

The output signal is applied to a winding 90 of the transformer 62 having a first end coupled to ground and a second end coupled to a lead 92. The transformer 62 may have a polarity relation indicated by dots 94, 96 and 98. To prevent voltage rises at the terminal 20 from affecting the stage 12, a unidirectional current conductive device such as a diode 100 has an anode coupled to the lead 92 and a cathode coupled to a lead 104 which in turn is coupled to the output terminal 20. An output signal of a waveform 106 may be applied to the third stage 14. It is to be noted that diodes 19, 52, 88 and 100 which function as rectifier diodes may be tunnel rectifiers used with a low reverse voltage and providing a low voltage drop in the forward direction for increased efficiency.

Figure 2:
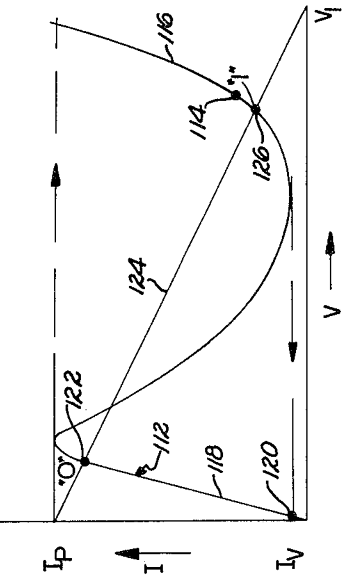
FIG. 2 is a graph of current versus voltage showing the characteristics of the tunnel diodes of FIG. 1.

Referring now also to FIG. 2, a curve 112 shows the characteristics of the tunnel diodes 30 and 78 of FIG. 1 for explaining the general operation of the shift register. The tunnel diode 30 in the absence of an input pulse of the waveform 46 is at a stable state such as shown by a point 114 on a valley curve 116 which is the high voltage and low current state with a relatively small current passing through the winding 38. The point 114 is determined by the potential of the battery 34 and the resistance of the winding 38. In response to the positive pulse of the waveform 46, the voltage across the tunnel diode 30 is lowered below the valley voltage and the current therethrough is lowered below the valley current $I_v$ to trigger the tunnel diode 30 from the valley curve 116 through the negative resistance region to a peak curve 118 at a point 120, for example. As is well known in the art, the characteristic curve 112 has a negative resistance region between the peak and valley curves thereof. Thus the voltage on the lead 45 rises rapidly. Current increases through the winding 38 and the operating point of the tunnel diode 30 rises on the peak curve 118 with a relatively small voltage change. After a time determined by the inductance of the transformer winding 38, the relatively small voltage drop of the tunnel diode 30 and the voltage of the battery 34, the tunnel diode 30 triggers across the peak of the curve 118 to the valley curve 116 as the current increases to the peak current $I_p$. The current then decreases through the winding 38 and the tunnel diode 30 returns to the stable point 114.

When the tunnel diode 30 triggers from the point 114 to the peak curve 118 in response to the positive pulse of the waveform 46, a positive pulse of a waveform 47 (FIG. 3) is formed on the lead 45 which is applied through the transformer 40 as a negative pulse of the waveform 51 on the lead 50. As a result, the diode 52 is forward biased and current flows from ground, through the winding 60 and the diode 52 through the winding 48 increasing until limited by the resistance of the path. Thus current is built up in the primary winding 60 of the transformer 62 and the negative voltage signal of the waveform 53 is formed on the lead 58. When the tunnel diode 30 passes through the peak and to the valley curve 116, the voltage rapidly falls on the lead 45 remaining relatively constant as the tunnel diode returns to the stable point 114. Thus the pulse of the waveform 51 rises on the lead 50 back biasing the diode 52 so that the energy stored in the primary winding 60 develops a positive inductive kick back on the lead 58 as shown by the positive pulse of the waveform 53. Diode 52 is thus biased into conduction and current flowing therethrough decreases exponentially until the diode 52 is again biased out of conduction. This operation provides the differentiation action of the differentiator 64. Thus the delayed positive pulse of the waveform 53 is provided to trigger the binary storage circuit 70 to a "one" state subsequent to the time of the shift pulse of the waveform 82. As will be explained subsequently, the input pulses of the waveform 46 and the shift pulses of the waveform 82 occur substantially at the same time. It is to be noted that in the absence of a positive pulse of the waveform 46 which condition represents a binary "zero" input signal, the pulses of the signal of the waveform 53 are not applied to the lead 58 as the pulse of the waveform 51 is not formed.

The tunnel diode 78 of the bistable flip flop circuit 70 is always returned to the low voltage state or binary "zero" of a point 122 in response to the negative shift pulse of the waveform 82 or remains at the point 122 if a "zero" has been stored therein. A load line 124 determined by the value of the resistor 74 and the voltage $V_1$ of the battery 68 crosses the peak curve 118 at the point 122 and crosses the valley curve 116 at a point 126. The load line 124 is thus selected to provide two stable binary points with the point 122 representing a binary zero and the point 126 representing a binary "one." Although the characteristics of both tunnel diodes is shown by a single curve 112 for convenience of explanation, the two tunnel diodes may have different characteristics in accordance with this invention.

In response to the positive pulse of the waveform 53 a positive pulse is applied through the transformer 62 and through the resistor 74 to the anode of the tunnel diode 78. The voltage across the tunnel diode 78 increases to the peak voltage and the current flowing therethrough increases to the peak current so that the tunnel diode changes state to the valley curve 116. As the current flowing through the winding 66 decreases, the tunnel diode 78 changes state in a relatively short time down the valley curve 116 to the stable "one" state of the point 126. It is to be noted that the negative pulse of the waveform 53 which occurs at the same time as the shift pulse of the waveform 82 has only the effect of aiding the shift pulse as the tunnel diode 78 is always returned to the point 122. It is also to be noted that in the absence of a pulse of the waveform 46 and a positive pulse of the waveform 53 representing a "zero," the tunnel diode 78 remains at the point 122.

At the time of the next shift pulse after the information is stored in the tunnel diode 78, the negative shift pulse of the waveform 82 is applied through the resistor 86 and through the diode 88 to the anode of the tunnel diode 78. As a result the voltage across the tunnel diode 78 is decreased to the valley voltage and the tunnel diode triggers to the low voltage state of the point 120. Thus a fall in voltage level on the lead 72 is applied through the transformer 62 to the lead 92 and the lead 104 as the positive output pulse of the waveform 106 representing a binary "one" applied to the shift register element at the time of the previous shift pulse. The tunnel diode 78 then changes to the stable "zero" state of the point 122 as current rapidly increases through the inductance of the winding 66. If the tunnel diode 78 has not been triggered to the "one" state but remains at the point 122 indicating that a "zero" is written therein, the negative shift pulse of the waveform 82 only causes a temporary change of state down the peak curve 118 and substantially no signal is applied to the lead 92. This absence of an output signal in response to the shift pulse indicates that a "zero" has been applied to the shift register circuit 12 at the time of the previous shift pulse.

The diode 52 prevents the shift pulse of the waveform 82 from triggering or affecting the tunnel diode 30 which has returned to the high voltage point 114. It is to be noted that the diode 100 prevents current from passnig from the terminal 20 to the lead 92 as a similar operation is formed in the third stage 14. The diode 19 similar to the diode 100 may be included in the first shift register stage 10.

Figure 3:
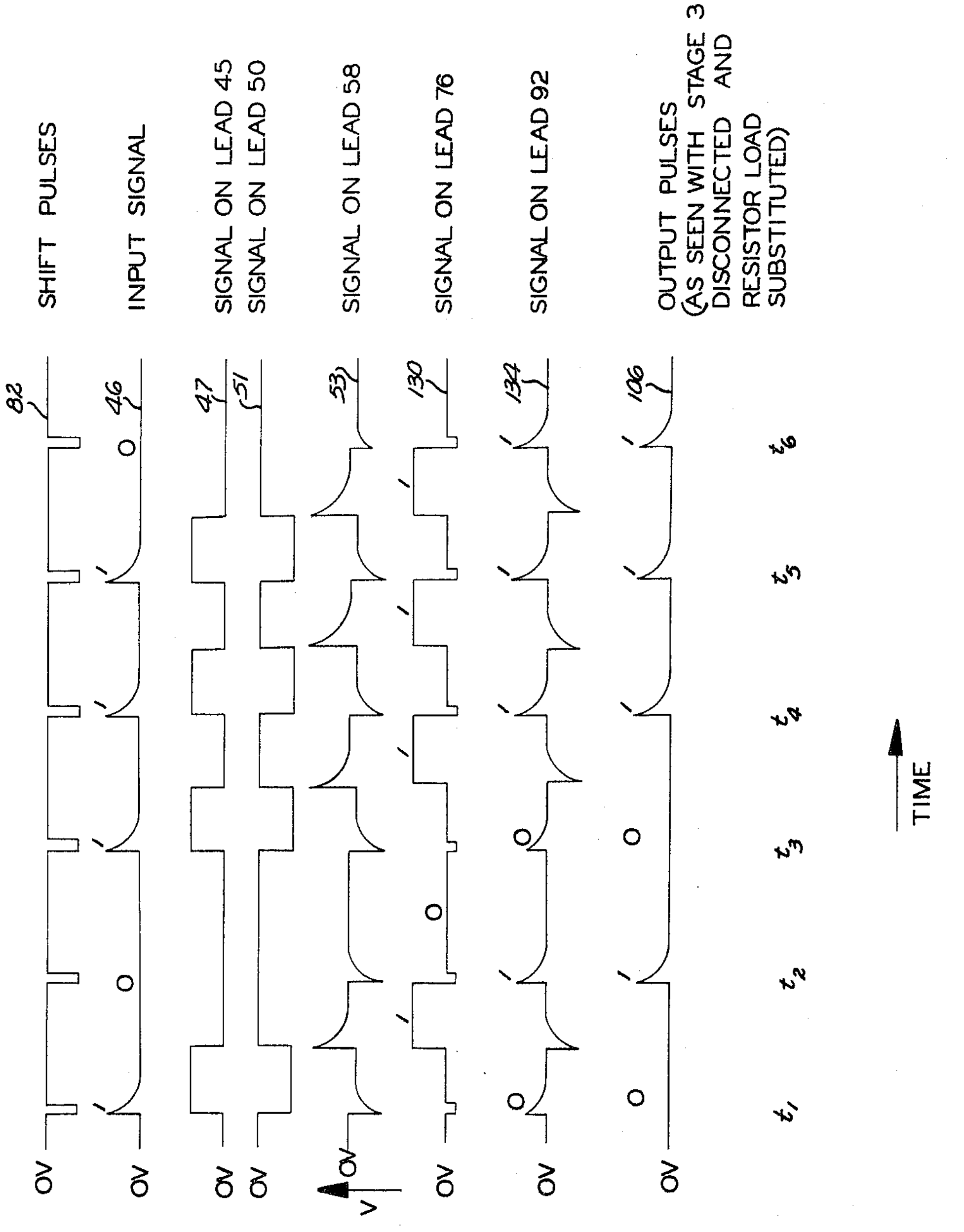
FIG. 3 is a diagram of waveforms for explaining the operation of the shift register of FIG. 1.

Referring now to the waveforms of FIG. 3 as well as to FIGS. 1 and 2, the timing operation of the shift register circuit in accordance with this invention will be explained in further detail. At a time $t_1$, the input signal of the waveform 46 is applied as a positive pulse representing a "one" to the cathode of the tunnel diode 30 to trigger the tunnel diode from the point 114 to the low voltage point 120. As a result the positive voltage of the waveform 47 is applied to the lead 45 and the negative voltage of the waveform 51 is applied to the lead 50 to bias the diode 52 into conduction. As current increases through the winding 60, the voltage on the lead 58 increases exponentially from a negative peak to a value at which steady state current is flowing therethrough. Also at time $t_1$ the shift pulse of the waveform 82 is applied through the diode 88 to interrogate the tunnel diode 78. The shift pulse and the input pulse occur at substantially the same time because the input pulse may result from the shift pulse reading stored information from the previous shift register stage 10. The tunnel diode 78 is at the zero point 122, for example, at time $t_1$ as a result of the "zero" being written therein at the previous time period. Thus the tunnel diode 78 does not trigger over the peak and only a small negative signal appears on the lead 76, as shown by a waveform 130. Essentially no change of signal is applied to the lead 92 as shown by the very low height of the positive pulse on a waveform 134 at time $t_1$. This small pulse is eliminated by the small forward voltage of diode 100 as shown by the waveform 106 on the lead 104. Thus the absence of a positive pulse on the lead 104 at time $t_1$ indicates that a zero has been shifted into the second shift register stage 12 at the previous time period.

When the current flowing through the winding 38 increases at a selected time period after time $t_1$, the tunnel diode 30 operating point reaches the peak current $I_p$ and changes state to the valley curve 116. The sudden voltage increase across the tunnel diode 30 causes a rapid voltage fall on the lead 45 of the waveform 47 which is applied as a voltage rise of the waveform 51 to the lead 50. Thus the diode 52 is back biased and the stored energy of the winding 60 develops an inductive response of the positive signal of the waveform 53 on the lead 58. The signal of the waveform 53 is applied to the lead 72 and the voltage across the tunnel diode 78 thus increases above the peak point and the tunnel diode is triggered to the valley curve 116 changing to the stable "one" point 126. Thus the signal on the lead 76 rises in voltage as shown by the waveform 130. It is to be noted that a negative signal is applied through the transformer 62 to the lead 92 but does not pass through the back biased diode 100 as shown by the waveform 106. It is also to be noted that the width of the negative pulse of the waveform 51 must be greater than the width of the shift pulse of the waveform 82 so as not to interfere with storage information in the tunnel diode 78. Thus, between times $t_1$ and $t_2$ a binary "one" has been stored in the binary flip flop circuit 70. The output pulse of the waveform 106 is shown for a condition with the third stage 14 disconnected and a resistive load added for clarity of explanation because the signal on the lead 104 appears similar to the waveform 47 due to the operation of a tunnel diode in the stage 14 similar to the tunnel diode 30.

At time $t_2$ in response to the negative shift pulse of the waveform 82, the tunnel diode 78 triggers from the valley point to the point 120 and the voltage on the lead 76 falls rapidly as shown by the waveform 130. In response to the fall of voltage on the lead 76, a positive pulse is applied to the lead 92 as shown by the waveform 134. Also a positive output pulse of the waveform 106 is applied through the diode 100 to the output terminal 20.

Also at time $t_2$, the input signal of the waveform 46 is at the lower voltage level indicating that a "zero" is being shifted from the shift register stage 10. The tunnel diode 30 remains at the stable point 114 and the signals on the leads 50, 58 and 72 remain substantially unchanged. Thus the tunnel diode 78 is not triggered between times $t_2$ and $t_3$ as shown by the substantially unchanged voltage level of the waveform 130 and remains in the "zero" state of the point 122.

At time $t_3$, in response to the shift pulse of the waveform 82, the tunnel diode 78 moves down the peak curve 118 for a short period and then returns to the zero point 122. Thus the signal on the lead 76 remains substantially unchanged as shown by the waveform 130 as well as the very small signal on the lead 92 as shown by the waveform 134. The output signal of the waveform 106 remains at the lower voltage level so that a "zero" signal is applied to the terminal 120 and to the third shift register stage 14. Also at time $t_3$, a pulse of the waveform 46 representing a binary "one" is applied to the input terminal 18. Thus the tunnel diode 30 is triggered to the point 120 and the negative pulse of the waveform 51 is applied to the lead 50. As a result the negative and positive pulses of the waveform 53 are formed on the lead 58 and the tunnel diode 78 is triggered to the stable point 126 in response to the signal on the lead 72 similar to the waveform 53. The negative pulse of the waveform 134 on the lead 92 between times $t_3$ and $t_4$ is not applied through the diode 100.

At time $t_4$ in response to the shift pulse of the waveform 82, the tunnel diode 78 is triggered to the "zero" state of point 122 and the signal of the waveform 130 on the lead 76 forms the positive signal of the waveform 134 on the lead 92. A positive pulse of the waveform 106 is applied to the output terminal 20. Also at time $t_4$ in response to the input signal of the waveform 46 a "one" input signal triggers the tunnel diode 30 from the point 114 to the point 120 and a delayed positive pulse of the waveform 53 is applied to the lead 58. A similar pulse is applied to the lead 72 to trigger the tunnel diode 78 to the "one" state of the point 126.

At time $t_5$, a binary "one" is interrogated from the tunnel diode 78 as the positive pulse of the waveform 106, and a "one" of the waveform 46 is written therein after a delay. At time $t_6$ in response to the shift pulse of the waveform 82, a binary "one" is interrogated from the tunnel diode 78 and applied to the output terminal 20 as the positive pulse of the waveform 106. Also at time $t_6$ the absence of a signal of the waveform 46 representing a binary "zero" causes the tunnel diode 30 to remain at the state of point 114 and the tunnel diode 78 remains at the zero point 122. The operation of the shift register stage continues in a similar manner and will not be explained in further detail.

Thus the circuit of FIG. 1 operates as a shift register providing a positive output pulse of the waveform 106 coincident with the shift pulse if a positive input pulse of the waveform 46 had been applied approximately coincident with the previous shift pulse. If a positive input pulse of the waveform 46 was not applied to the shift register stage at the time of the previous shift pulse, then an output pulse is not applied to the output terminal at the time of the subsequent shift pulse. The first tunnel diode 30 responds to the positive input pulse to form a delayed negative pulse of the waveform 51 which is differentiated so that a positive delayed pulse is developed coincident with the trailing edge of the delayed negative pulse, which in turn triggers the tunnel diode 78 to a binary "one" state. In the absence of an input pulse, the tunnel diode 30 is not triggered and the tunnel diode 78 remains in the "zero" state. The tunnel diode 78 remains at the triggered state until the subsequent shift pulse and is either triggered to the zero state or remains thereat to respectively apply a positive pulse or a low level signal representing the absence of a pulse to the output terminal 20.

It is to be noted that the second shift register stage 12 is only representative of one of a plurality of stages and the principles in accordance with this invention include a single stage or a plurality of shift register stages.

Thus there has been described a circuit that may be utilized in binary shift register stages requiring a single shift pulse to shift all digits by one stage position. The circuit utilizes negative resistance devices such as tunnel diodes to provide both a delay and a temporary storage of binary information so as to require a minimum number of components in each stage. Because of the trigger action of the tunnel diodes, the shift register circuit is highly reliable and may operate to shift information at a relatively high rate.

What is claimed is:

1. A shift register circuit responsive to a source of informational pulses and to a source of periodic shift pulses, each of the informational pulses occurring at a time coincident with a shift pulse comprising a first series path coupled to the source of informational pulses and including a first tunnel diode and a first transformer, differentiating means coupled to said first transformer, a second series path including a second transformer and a second tunnel diode with the second transformer coupled to said differentiating means and said second tunnel diode coupled to said source of shift pulses, and unidirectional output means coupled to said second transformer, whereby said first tunnel diode forms an elongated pulse in response to said informational pulse and said differentiating means forms a delayed pulse to trigger said second tunnel diode from a first to a second stable state, the next shift pulse triggering said second tunnel diode to said first state to apply an output pulse through said unidirectional output means.

2. A shift register combination responsive to input signals and timing signals being substantially coincident in time comprising a first series path including a first tunnel diode and first inductive means, said first tunnel diode responsive to an input signal to form an elongated pulse, differentiating means coupled to said first series path for forming a delayed pulse, a second series path coupled to said differentiating means and including a second tunnel diode responsive to said delayed pulse to be triggered to a first state, said second tunnel diode responding to the timing signal after said delayed pulse to be triggered to a second state to form an output signal, and output means coupled to said second series path to pass said output signal.

3. A shift register circuit responsive to a source of input pulses and to a source of periodic shift pulses with each input pulse occurring in substantial time coincidence with a shift pulse comprising first and second transformers with the first transformer having first and second windings and the second transformer having first, second and third windings, a first series path coupled to the source of input pulses including a first tunnel diode and the first windings of said first transformer to form an elongated pulse in response to an input pulse, a rectifier diode coupled between the second winding of said first transformer and the first winding of said second transformer, said rectifier diode and the first winding of said second transformer forming a differentiating means to develop a delayed pulse in response to the elongated pulse, a second series path including the second winding of said second transformer and a second tunnel diode with said second tunnel diode coupled to said source of shift pulses, and unidirectional output means coupled to the third winding of said second transformer, whereby said first tunnel diode forms the elongated pulse in response to an input pulse and said differentiating means forms the delayed pulse to trigger said second tunnel diode from a first to a second stable state after a delay interval from the shift pulse occurring at the time of said input pulse, the next shift pulse triggering said second tunnel diode to said first state to apply an output pulse through said unidirectional output means.

4. A shift register circuit responsive to a source of input pulses and to a source of shift pulses with each input pulse occurring at substantially the same time as a shift pulse comprising first and second transformers with the first transformer having first and second windings and the second transformer having first, second and third windings, a first series path coupled to the source of input pulses including a first tunnel diode and the first winding of said first transformer, first biasing means coupled to said first series path for maintaining said first tunnel diode in a stable state, said first tunnel diode forming a pulse in response to an input pulse, a first rectifier diode coupled between the second winding of said first transformer and the first winding of said second transformer, said first rectifier diode and the first winding of said second transformer forming a differentiating means to develop a delayed pulse in response to the pulse formed by said first tunnel diode, a second series path including the second winding of said second transformer, a load impedance and a second tunnel diode with said second tunnel diode coupled to said source of shift pulses, second biasing means coupled to said second series path for maintaining said second tunnel diode in a first or a second stable state, a second rectifier diode coupled to the third winding of said second transformer, whereby said first tunnel diode forms a pulse in response to an input pulse and said differentiating means forms the delayed pulse to trigger said second tunnel diode from the first to the second stable state, said shift pulse triggering said second tunnel diode to said first state to apply an output pulse through said second rectifier diode.

5. A shift register circuit responsive to a source of input signals and a source of periodic shift pulses, said input signals having either a pulse or the absence of a pulse at substantially the time of each shift pulse, said circuit applying signals to an output terminal delayed the period between two adjacent shift pulses comprising a first series path including a tunnel diode and a first transformer with the source of input signals coupled to said first tunnel diode, a second series path including a second transformer and a second tunnel diode with the source of shift pulses coupled to said second tunnel diode, a first rectifier diode coupled between said first and second transformers, and a second rectifier diode coupled between said second transformer and the output terminal, whereby said first tunnel diode responds to an input pulse to form an elongated pulse, said first rectifier diode and said second transformer forming a delayed pulse in response to said elongated pulse to trigger said second tunnel diode from a first stable state to a second stable state, said first and second tunnel diodes being substantially undisturbed in response to the absence of an input pulse, the subsequent shift pulse triggering said second tunnel diode from said second state to said first state to apply an output pulse through said second rectifier diode to said output terminal, said second tunnel diode being substantially undisturbed in said first stable state in response to said shift pulse to provide an absence of a pulse at said output terminal.

6. A shift register circuit responding to periodic shift pulses from a first source of pulses and to the presence or absence of a pulse of an input signal occurring substantially at the same time as the shift pulses from a second source of pulses to apply an output signal representing the presence or absence of a pulse to an output terminal after a one period delay comprising a first source of potential, a first tunnel diode having an anode to cathode path coupled to the second source of pulses, a first transformer having first and second windings with the anode to cathode path of said first tunnel diode and the first winding of said first transformer respectively coupled in series across said first source of potential, a second source of potential, a second tunnel diode having an anode to cathode path, a second transformer having first, second and third windings with the first winding and the anode to cathode path of said second tunnel diode respectively coupled in a series path across said second source of potential, a first rectifier diode having an anode to cathode path respectively coupled between the second windings of said first and second transformers, said first source of pulses coupled to the series path between said first winding of said second transformer and the anode to cathode path of said second tunnel diode, and a second rectifier diode coupled between the third winding of said second transformer and the output terminal, whereby during each shift pulse said first tunnel diode changes state to form an elongated pulse in response to a pulse of said input signal or is substantially undisturbed in response to the absence of an input pulse, said second tunnel diode responding to said first tunnel diode changing state to change from a first to a second stable state after a delay interval, said second tunnel diode returning to said first stable state in response to a shift pulse to apply an output pulse through said second rectifier diode to said output terminal, said second tunnel diode remaining in said first stable state in response to the absence of an input pulse and being substantially undisturbed in response to the shift pulse so that an output signal representing the absence of a pulse is applied to said output terminal.

7. A circuit for providing an output pulse coincident with a shift pulse if an input pulse has been applied substantially coincident with a previous shift pulse comprising a source of input pulses, a source of shift pulses, a first transformer having first and second windings, a second transformer having first, second and third windings, a first series path including a first tunnel diode and the first winding of said first transformer, means coupling said source of input pulses to said first tunnel diode, first biasing means coupled to said first series path to control said first tunnel diode to have a single stable state, a second series path including the first winding of said second transformer, a second tunnel diode and an impedance load, second biasing means coupled to said second series path to control said second tunnel diode to have first and second stable states, a first rectifier diode coupled between the second winding of said first transformer and the second winding of said second transformer, said source of shift pulses coupled to said second tunnel diode, and output means including a second rectifier diode coupled to the third winding of said second transformer, whereby in response to said input pulse said first tunnel diode provides a pulse which is differentiated by said first rectifier diode and the second winding of said second transformer to form a delayed pulse to trigger said second tunnel diode from said first stable state to said second stable state, said second tunnel diode responding to the shift pulse to trigger to said first stable state and apply an output pulse to said output means.

8. A shift register circuit responding to periodic negative shift pulses from a source of shift pulses and to an input signal having the presence or absence of a positive input pulse occurring substantially at the same time as each shift pulse from a source of input pulses to apply output signals representing the presence or absence of a positive pulse to an output terminal after one period delays comprising a first source of positive potential, a first tunnel diode having an anode and a cathode, a first transformer having first and second windings with the anode to cathode path of said first tunnel diode and the first winding of said first transformer respectively coupled in series across said first source of potential to apply a positive potential to the anode of said first tunnel diode, said source of positive pulses coupled to the cathode of said first tunnel diode, a second source of positive potential, a second tunnel diode having an anode and a cathode, a resistor, a second transformer having first, second and third windings with the first winding, said resistor, and the anode to cathode path of said second tunnel diode respectively coupled in series across said second source of potential to apply a positive potential to the anode of said second tunnel diode, a first rectifier diode having an anode to cathode path respectively coupled between the second windings of said first and second transformers, said source of negative shift pulses coupled to the anode of said second tunnel diode, and a second rectifier diode coupled between the third winding of said second transformer and the output terminal, said first transformer having a polarity relation to invert signals between said first tunnel diode and said first rectifier diode and said second transformer having a polarity relation to apply signals from said first rectifier diode to said second tunnel diode without an inversion and to said second rectifier diode with an inversion and to apply output signals from said second tunnel diode to said second rectifier diode with an inversion, whereby in response to a positive input pulse said first tunnel diode forms an elongated pulse and said first rectifier diode applies a delayed pulse to said second tunnel diode to trigger said second tunnel diode from a first to a second stable state and the subsequent shift pulse triggers said second tunnel diode to said first state to apply a positive output pulse through said second rectifier diode, and in response to the absence of a positive input pulse, said first tunnel diode remaining substantially undisturbed and said second tunnel diode remaining in said first state to be substantially undisturbed in response to a shift pulse so that an output signal as the absence of a positive pulse is applied to said output terminal.

References Cited by the Examiner

UNITED STATES PATENTS

| | | | |
|---|---|---|---|
| 2,794,123 | 5/1957 | Younker | 328—58 |
| 3,097,312 | 7/1963 | Miller | 307—88.5 |
| 3,121,176 | 2/1964 | Burns et al. | 307—88.5 |

FOREIGN PATENTS

| | | |
|---|---|---|
| 159,041 | 9/1954 | Australia. |

ARTHUR GAUSS, *Primary Examiner.*